United States Patent
Tarbell

(10) Patent No.: US 11,065,738 B2
(45) Date of Patent: Jul. 20, 2021

(54) ELECTRICAL DEVICE ALIGNING TOOL AND METHOD OF USING SAME

(71) Applicant: Nonconductive Tool Company, LLC, Torrance, CA (US)

(72) Inventor: Warren Tarbell, Torrance, CA (US)

(73) Assignee: NONCONDUCTIVE TOOL COMPANY, LLC, Torrance, CA (US)

( * ) Notice: Subject to any disclaimer, the term of this patent is extended or adjusted under 35 U.S.C. 154(b) by 375 days.

(21) Appl. No.: 15/975,597

(22) Filed: May 9, 2018

(65) Prior Publication Data
US 2018/0326560 A1  Nov. 15, 2018

Related U.S. Application Data

(60) Provisional application No. 62/503,873, filed on May 9, 2017.

(51) Int. Cl.
*B25B 9/04* (2006.01)
*H02G 1/00* (2006.01)

(52) U.S. Cl.
CPC  *B25B 9/04* (2013.01); *H02G 1/00* (2013.01)

(58) Field of Classification Search
CPC ....... H02G 1/00; B25B 9/04; Y10T 29/53174; Y10T 29/53257; B65H 31/34; B65H 31/36; B65H 31/38; B65H 31/40
USPC ................. 29/729, 758, 759, 764, 762, 760, 29/739–741
See application file for complete search history.

(56) References Cited

U.S. PATENT DOCUMENTS

| | | | | |
|---|---|---|---|---|
| 3,516,142 A | * | 6/1970 | Mottl ................. | H05K 13/0007 29/741 |
| 4,152,827 A | * | 5/1979 | Walton, II .......... | H05K 13/0491 29/278 |
| 4,392,301 A | * | 7/1983 | Hannes .............. | H05K 13/0491 29/741 |
| 4,461,073 A | * | 7/1984 | Harringer .......... | H05K 13/0491 29/741 |
| 4,756,078 A | * | 7/1988 | Dougherty ......... | H05K 13/0491 29/268 |
| 4,858,309 A | * | 8/1989 | Korsunsky ......... | H01R 12/7005 29/764 |
| 4,866,838 A | * | 9/1989 | Porter ................ | H05K 13/0491 29/741 |

(Continued)

*Primary Examiner* — Peter Dungba Vo
*Assistant Examiner* — Kaying Kue
(74) *Attorney, Agent, or Firm* — Sheppard, Mullin, Richter & Hampton LLP

(57) ABSTRACT

Embodiments disclosed herein include devices and methods for aligning an electrical device. The electrical device aligning tool may include a body member, comprising an end panel at each opposing longitudinal end of the body member and forming a longitudinally perpendicular angle with the body member. The tool may also include an intersecting member coupled to the body member and positioned such that a length of the intersecting member longitudinally intersects the body member at an angle. Additionally, the intersecting member may include an expanding and contracting mechanism, and lateral members coupled to the expanding and contracting mechanism such that the lateral members move horizontally along a front surface of the intersecting member, with respect to a movement of the expanding and contracting mechanism.

19 Claims, 10 Drawing Sheets

(56) References Cited

U.S. PATENT DOCUMENTS

| | | | | | |
|---|---|---|---|---|---|
| 4,979,287 | A | * | 12/1990 | Schwab | H05K 13/0491 29/741 |
| 5,230,143 | A | * | 7/1993 | Karlovich | H01R 43/26 29/758 |
| 5,257,775 | A | * | 11/1993 | Burns | E04B 9/006 269/102 |
| 5,502,887 | A | * | 4/1996 | Gonzales | H05K 13/0491 29/758 |
| 5,507,098 | A | * | 4/1996 | Schaver, Jr. | H02G 1/00 33/347 |
| 5,549,240 | A | * | 8/1996 | Urban | B23K 1/018 228/264 |
| 5,842,261 | A | * | 12/1998 | Ortiz | B25B 27/023 29/426.5 |
| 6,052,892 | A | * | 4/2000 | Boe | B25B 13/48 29/240 |
| 6,202,294 | B1 | * | 3/2001 | Bogannam | H01R 43/22 174/350 |
| 6,249,960 | B1 | * | 6/2001 | Faesel | H01R 43/22 29/750 |
| 6,765,146 | B1 | * | 7/2004 | Gerardo | H02G 1/00 174/50 |
| 6,942,137 | B2 | * | 9/2005 | Bolde | B23K 1/018 228/44.7 |
| 8,938,873 | B2 | * | 1/2015 | Kobayashi | H01R 13/62938 29/750 |
| 9,912,130 | B1 | * | 3/2018 | Burns | B25B 9/04 |
| 10,477,744 | B2 | * | 11/2019 | Tarbell | H02H 3/00 |
| 2002/0092157 | A1 | * | 7/2002 | Yoshida | H05K 13/0853 29/740 |
| 2002/0157244 | A1 | * | 10/2002 | Bollesen | H05K 13/0491 29/829 |
| 2003/0051338 | A1 | * | 3/2003 | Buley | H05K 3/303 29/830 |
| 2009/0193641 | A1 | * | 8/2009 | Barna | H05K 7/1415 29/426.5 |
| 2011/0094078 | A1 | * | 4/2011 | Wadach | H01R 43/205 29/426.5 |
| 2011/0146065 | A1 | * | 6/2011 | Nagata | B08B 1/008 29/729 |
| 2012/0045292 | A1 | * | 2/2012 | Kaye | F16B 13/0808 411/80.1 |
| 2012/0248685 | A1 | * | 10/2012 | Tsai | B65H 31/34 271/240 |
| 2014/0263865 | A1 | * | 9/2014 | Salian | H02G 3/121 248/49 |
| 2017/0040780 | A1 | * | 2/2017 | Moore | B21D 3/02 |

\* cited by examiner

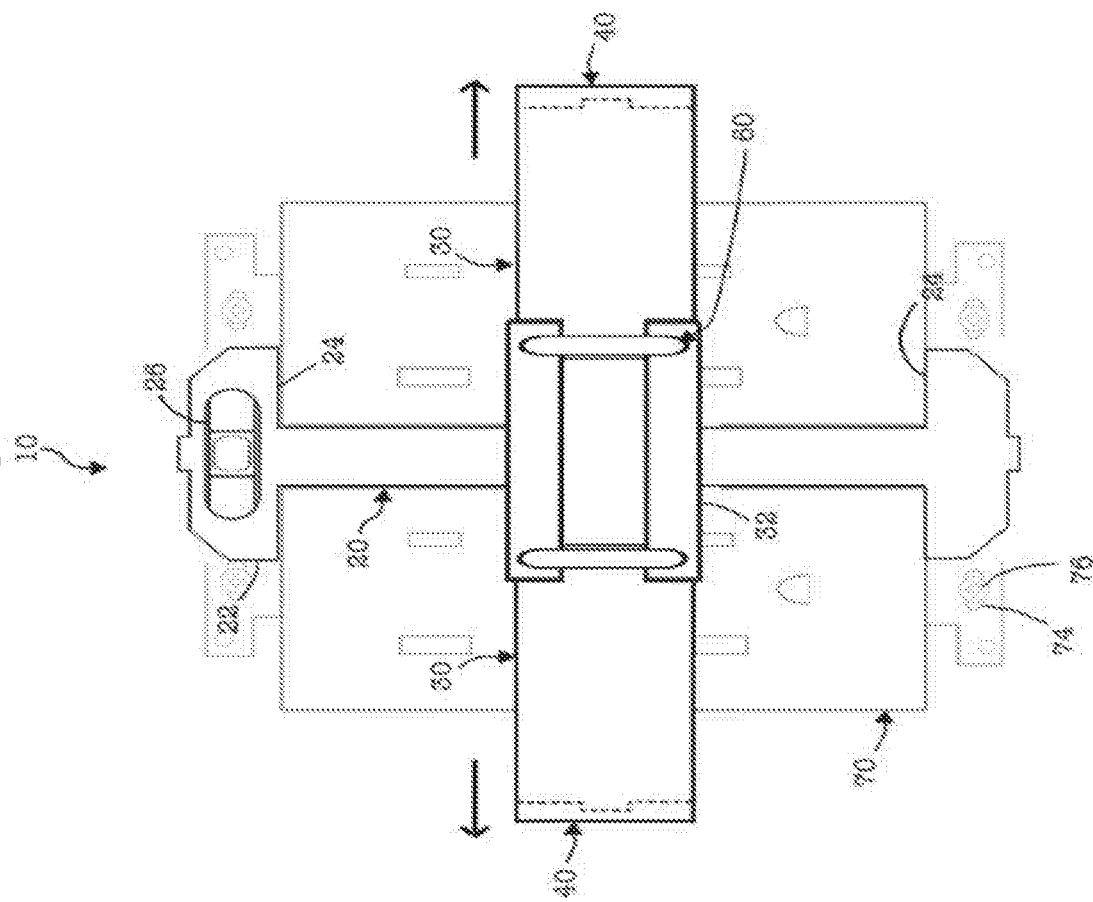
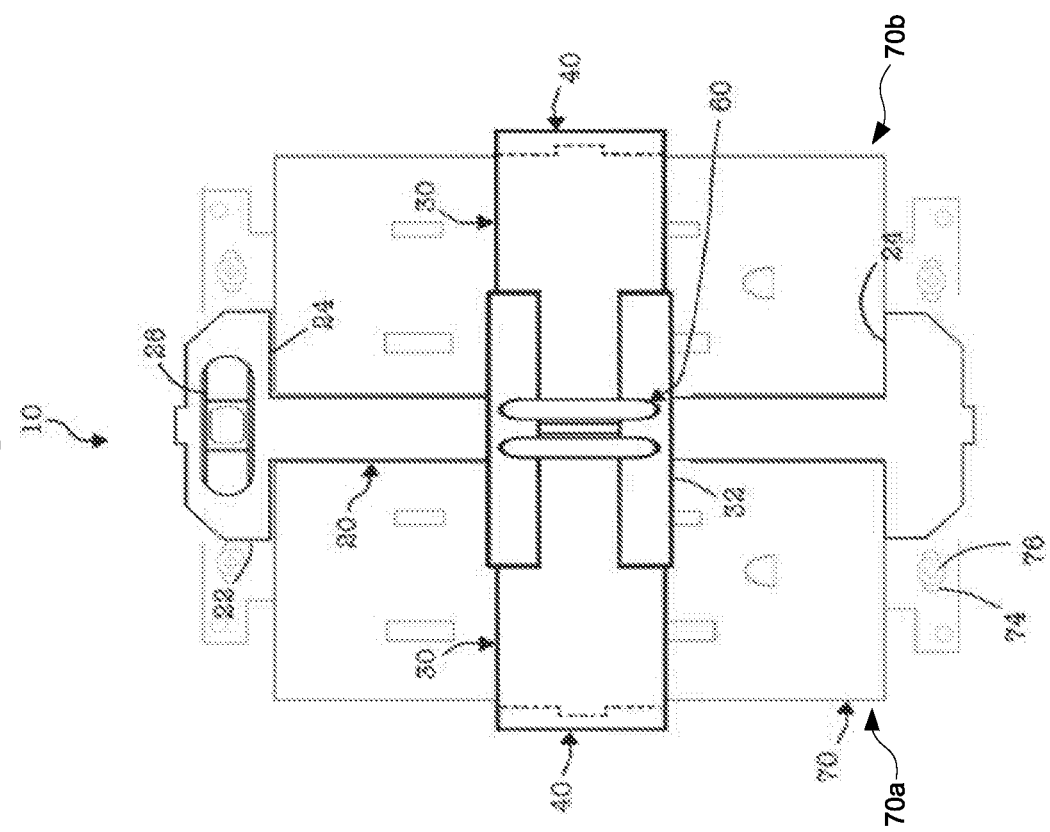

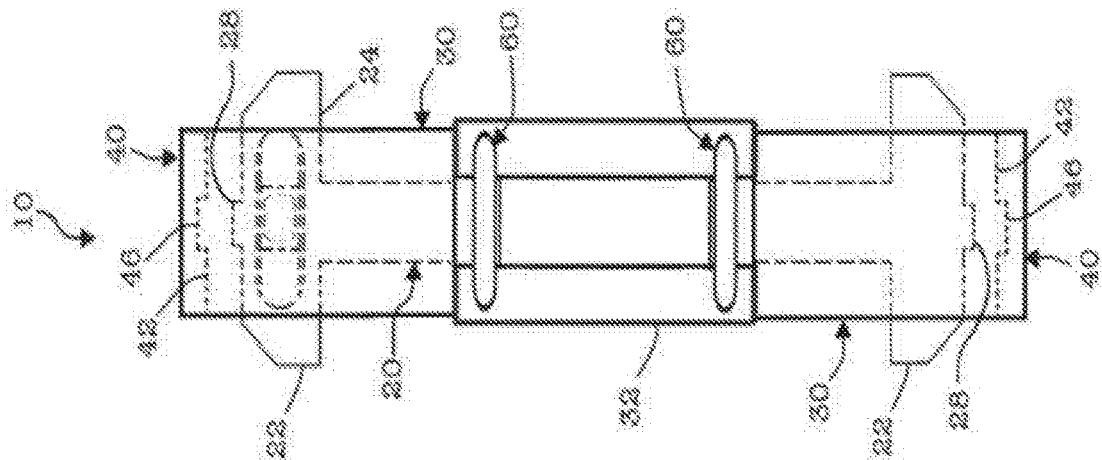

ELECTRICAL DEVICE ALIGNING TOOL AND METHOD OF USING SAME

CROSS-REFERENCE TO RELATED APPLICATIONS

This application claims the benefit of U.S. Provisional Patent Application Ser. No. 62/503,873, filed May 9, 2017. This application hereby incorporates herein by reference, the complete contents of the above referenced United States Provisional Patent Application, in its entirety.

TECHNICAL FIELD

The disclosed technology relates generally to electrical tools, and more particularly, some embodiments relate to a tool for aligning electrical devices and methods of using the same.

DESCRIPTION OF THE RELATED ART

Electrical workers are often considered to be engaged in a very dangerous profession. Electrical workers are tasked with working on high voltage, high current electrical circuits. Although electrical workers take many precautions against the risk of shock, accident still occur. Miswiring of the circuit or mislabeling of junction boxes and components can cause an electrician to be exposed to a live circuit even after he or she has taken reasonable steps to turn off the circuit. To exacerbate this problem, electrical workers are often required to manipulate electrical components with their hands or with metal tools. For example, to pull an electrical socket out of a wall box, electricians often use their hands. Consequently, they might accidentally touch the electrical posts carrying electricity to the socket. Furthermore, electrical components, for example wires and terminals, may unintentionally come into contact with other electrical devices, or junction boxes, while the device is being installed in or removed. Accidental contact between conductors can cause various hazardous conditions, such as an arc fault, which is a high-power discharge of electricity that can translate into heat and potentially trigger an electrical fire.

BRIEF SUMMARY OF EMBODIMENTS

According to various embodiments of the disclosed technology, an electrical device aligning tool is described. According to one embodiment, the electrical device aligning tool may include: a body member, comprising an end panel at each opposing longitudinal end of the body member and forming a longitudinally perpendicular angle with the body member; and an intersecting member coupled to the body member and positioned such that a length of the intersecting member longitudinally intersects the body member at an angle, the intersecting member comprising: expanding and contracting mechanism, and lateral members coupled to the expanding and contracting mechanism such that the lateral members move horizontally along a front surface of the intersecting member, with respect to a movement of the expanding and contracting mechanism.

Other various embodiments, may include a method for handling an electrical device shield tool. Some embodiments may include: obtaining the electrical device shield tool; inserting the electrical device shield tool over an existing electrical device and an metal enclosure housing the electrical device; expanding a body of the electrical device shield outward with respect to a movement of an expanding and contracting mechanism, such that a first half and a second half of the body are moved away from each other to form a space, wherein the electric device is accessible in the space between the first half and the second half of the body; and inserting one of protruding edges of a metal enclosure into a respective groove on each of two side surfaces of the body to affix the body to the metal enclosure and form a barrier for the electrical device from the metal enclosure.

Other embodiments may include a wire holder device that accepts and holds wires in a secure position, in a manner that reduces the risk of accidental contact.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "front," "back," "bottom" or "side" views, such references are merely descriptive and do not imply or require that the disclosed technology be implemented or used in a particular spatial orientation unless explicitly stated otherwise.

FIG. 2A is a top view of the example electrical device aligning tool illustrated in FIG. 1 arranged in an example contracted configuration of the tool in operation.

FIG. 2B is a top view of the example electrical device aligning tool illustrated in FIG. 1 arranged in an example fully opened perpendicular configuration of the tool in operation.

FIG. 2C is a top view of the example electrical device aligning tool illustrated in FIG. 1 arranged in an example rotating alignment wing configuration of the tool in operation.

FIG. 2D is a top view of the example electrical device aligning tool illustrated in FIG. 1 arranged in an example closed position configuration of the tool in operation.

DETAILED DESCRIPTION OF THE EMBODIMENTS

Embodiments of the technology disclosed herein are directed toward devices and methods for aligning an electrical device for operations, for example installing a cover plate over the electrical devices. Embodiments can be configured to align various electrical device, such as electrical outlets, in a manner that may: increase precision of the alignment; assists humans, for instance electrical workers, to better perform tasks necessitating properly aligned components; and prevent accidental contact with electrical components.

The tool includes a spacer body, which may be inserted between electrical devices to adjust spacing of the devices relative to each other, for example. Furthermore, the tool includes device alignment wings, coupled to the top surface of the spacer body, and capable of pivoting to various positions in relation to the spacer body. Consequently, based on movement of the device alignment wings, the tool can be arranged in various configurations. The device alignment wings can be positioned approximately perpendicular to the spacer body in an open configuration, which allows the tool to engage electrical devices. Additionally, the tool can include device alignment brackets that extend downward from the side surfaces of the device alignment wings. Moreover, handles may be mounted on the tool such that the device alignment brackets can be expanded and/or contracted, with respect to movement of the handles. Accordingly, the tool can conform to dimensions of the electrical devices, firmly pressing against lateral surfaces of the electrical devices, for example, such that the devices are precisely aligned.

Figure 1:
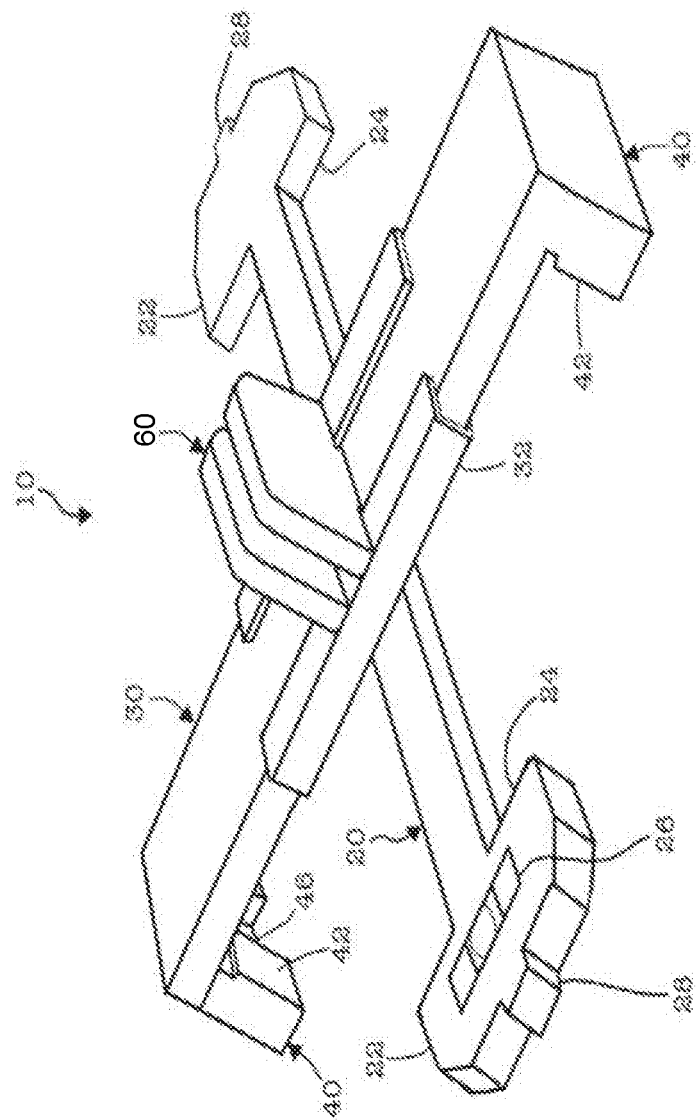
FIG. 1 is a diagram illustrating an example electrical device aligning tool in accordance with one embodiment of the technology described herein.

FIG. 1 is a diagram illustrating an example electrical device aligning tool 10 in accordance with one embodiment of the technology described herein. In the perspective view of tool 10, as seen in FIG. 1, the structure may be generally described as including two main members, a spacer body 20 and device alignment wings 30. In the illustrated example, both the spacer body 20 and the device alignment wings 30 can be predominately linear (e.g., straight, flat, etc.) and elongated panels (dimensioned to be generally larger in respect to length, as opposed to width) that are arranged substantially perpendicular to each other. Restated, the device alignment wings 30 can be described as a member that longitudinally intersects the spacer body 20 (e.g., forms an angle with respect to a longitudinal surface). The device alignment wings 30 may be coupled to a top surface of the spacer body 20, and arranged such that the device alignment wings 30 are on top of the spacer body 20 in a length-wise manner, across the width of the spacer body 20.

In the illustrated example, the device alignment wings 30 cross the spacer body 20, meeting at the respective center points (relative to length) for each member, and forming 90-degree angles between the members from this point of intersection. Thus, in the example configuration shown in FIG. 1, the structured geometry of the tool 10 can be generally described as a "t" shape. According to this example geometrical structure, the spacer body 20 may be considered the base member of the tool 10, and halves of the device alignment wings 30 (relative to length) extend horizontally from each side of this base forming "wings". During operation, illustrated in FIG. 2A for example, the spacer body 20 can serve as the aforementioned base of the tool 10. Referring to FIG. 2A for this example, the spacer body 20 is positioned, having its length aligned vertically, and then inserted between the electrical devices 70. As seen, the spacer body 20 is inserted such that the length of the spacer body 20 runs parallel to the length of the devices 70. The device alignment wings 30 are designed to be an adjustable member of the tool 10, and thus are capable of movement while aligning the electrical devices 70. For example, the wings 30 may rotate from its center during alignment. In contrast, the spacer body 20, acting as the tool's 10 base member, remains stably situated between the electrical devices 70, as the alignment operations are performed.

According to the embodiments, the tool 10 can be used to align electrical devices 70 such that the devices 70 are optimally positioned for a specific operation, thereby assisting humans handling potentially dangerous electrical components, such as electrical workers. As an example, the tool 10 can align electrical devices 70 into respective positions that allow a cover plate to easily slip over them, without further adjustment of the devices 70 or screws 76. It should be appreciated that the electrical device aligning tool 10 can be used, for instance with additional tools, to initially align electrical devices 70 to ultimately achieve a plurality of other operations relating to the devices, for example removal, installation, or handling.

FIGS. 2A-2E are diagrams illustrating top views of the electrical device aligning tool 10 arranged in various example configurations, in accordance with embodiments described herein. Furthermore, FIGS. 2A-2E show a top, or front view of the tool 10, hereinafter referred to as the front surface, or face, of the tool. FIGS. 3A-3B are end views of the example electrical device aligning tool 10 illustrated in FIG. 1. In an embodiment, the tool 10 can include handles 60 that are coupled to device alignment brackets 40 in a manner allowing the brackets 40 to be capable of slidable movement, with respect to a movement of the handles 60. FIG. 1, FIGS. 2A-2E, and FIGS. 3A-3B illustrate examples of the tool 10, in accordance with this embodiment. To this end, reference is made to FIG. 1, FIGS. 2A-2E, and FIGS. 3A-3B in further describing details of the embodiment herein.

Referring now to FIG. 2A, the electrical device aligning tool 10 is illustrated in an example configuration, for instance while engaging electrical devices 70 during an alignment operation. In this example, electrical devices 70 can be, for example, an electrical outlet, a receptacle, switch, timer, sensor, etc. Particularly in this view, a front surface of the tool 10 is shown including the spacer body 20 and the device alignment wings 30 arranged in the "t" shape, or an open position, as previously described in reference to FIG. 1. FIG. 2A shows an example configuration including two adjacent electrical devices 70. This can be the scenario when an enclosure, for instance a junction box, houses neighboring electrical devices 70. Accordingly, the open position for tool 10 can be configured to expand or conforming to dimensions of a single device 70a, an adjacent electrical device 70b, or the two electrical devices 70.

In FIG. 2A, the alignment spacer body 20 is shown to be inserted in-between electrical devices 70. The electrical devices 70 can be neighboring devices enclosed within a junction box, for example. In some cases, electrical devices 70 may be restricted from movement, for instance being screwed in place inside of a junction box. FIG. 2A illustrates device mounting screws 76 that may be tightened within an elongated screw hole 74 to secure the electrical devices 70 into position. According, in continuing with the example, after initially positioning the tool 10, device mounting screws 76 can be loosened to allow for the electrical devices 70 to move, or otherwise re-positioned, for instance by the tool 10, as necessary for ensuring that the electrical devices are aligned. Then, with the screws 76 loose, the electrical devices 70 can be slid towards the spacer body 20.

In an embodiment, a principal function of the spacer body 20 is to assist with appropriately spacing the electrical devices 10 in relation to each other. Installing a device cover plate may require that an appropriate amount of separation between the devices 70 be present. In this scenario, the tool 10 can be employed to space the electrical devices. Referring back to the example, one of the electrical devices 70a can be placed in a desired position first. Subsequently, the other device 70b can be aligned with respect to the first device 70a. However, prior to aligning, the first device 70a may be secured in place. For instance, screw 76 can be re-tightened, allowing device 70a to be suitably stable for resting the tool 10 against during aligning. The spacer body 20 can be arranged with respect to the first device 70a. The second electrical device 70b can be moved against the spacer body 20, thereby positioning the second device at a desired distance, and ensuring that electrical devices are precisely spaced apart. Consequently, the electrical devices 70 are aligned in a position for easily placing the cover plate. In some embodiments, the tool 10 may be specifically dimensioned, for example based on the dimensions of another electrical component or for an anticipated application. Referring to the cover plate example, the dimensions of the cover plate may require the electrical devices 70 to be position at a particular distance apart from each other and/or a particular distance away from the bottom edge of an enclosure. To this end, the tool 10 can be constructed to particularly align the electrical devices at these distances. For example, the spacer body can be configured to horizontally align the electrical devices at the first distance, and the device height alignment heads 22 may be configured to vertically align the electrical devices 70 at the second distance.

Moreover, the electrical device aligning tool 10 includes additional elements, generally used for alignment against several edges around the perimeter of electrical devices 70. In instances where aligning is performed relative to a single surface or edge, there may be an increased risk of misalignment or lack of precision. Thus, the tool 10 may realize a solution that better assists electrical workers, and improves an overall precision of aligning and spacing. Again, referring to FIG. 1 and FIGS. 2A-2E, the illustrated example shows that the tool 10 may include device height alignment heads 22 (e.g., for end surfaces), device alignment brackets 40 (e.g., for lateral surfaces).

For instance, in the illustrated example, opposing longitudinal ends of the spacer body 20 (e.g., separated by a distance that is the length of the spacer body 20) are designed as smaller (relative to the two main members) end panels to form devices alignment heads 22. The device alignments heads 22 are constructed length-wise across the width of the body 20 (e.g., parallel to the device alignment brackets 30), such that certain sections of the heads 22 serve as longitudinally perpendicular extensions from the main section of body 20. In operation, the tool 10 can be adjusted to place electrical devices 70 in contact with these device alignment heads 22 in a manner ensuring that the heights of the electrical devices 70 are positioned evenly (e.g., points along the top and bottom surfaces of the electrical devices 70, respectively, form a straight line), thereby achieving vertical alignment.

As shown in FIG. 1 and FIG. 2A, for example, the device alignment heads 22 form approximate 90-degree corner surfaces, on both sides (relative to a width) and at opposite ends (relative to length) of the space body 20. These surfaces of the heads 22 are hereinafter referred to as device height alignment edges 24, which serve to demarcate a point on a vertical axis along the horizontal plane. FIG. 2A illustrates that device height alignment edges 24 are preferably straight surfaces situated at the longitudinal ends of the tool 10, such that the edges 24 can be used to "level" another surface against them.

Furthermore, FIGS. 2A-2C show that device alignment heads 22 can include built-in levels 26, which can further assist in leveling surfaces against the tool 10 in accordance with known techniques. For example, the spacer body 20 can be configured such that the body's 20 height, cornered-off in the horizontal plane by the device height alignment head 22, is substantially approximate to a vertical height of the electrical devices 70. Thus, the tool 10 can engage the devices 70 in a manner where the corners protruding from a side surface of both devices 70 are mated with corresponding inverted corners of the tool 10 (e.g., end surfaces of the electrical device 70 contact device height alignment heads 22). The tool 10 can effectively vertically align each of electrical devices 70 against the spacer body 20, which in turn, aligns the devices 70 to each other relative to their heights.

Additionally, the electrical device aligning tool 10 may include device alignment brackets 40. Referring again to FIG. 1, device alignment brackets 40 may be constructed as lateral sections of the device alignment wings 30, that extend down from the opposing sides (relative to length) of the surface of the member. The alignment brackets 40, extending outwards from the face of the tool 10, can be inserted around the external perimeter of the electronic devices. According to the embodiments, the device alignment brackets 40 are capable of sliding and are constructed relative to one another such that they can be expanded from each other to be positioned over the electrical device, and slidably contracted reducing the space between to eventually rest against the sides of the electrical devices. Thus, the device alignment brackets 40 can provide contact with lateral surfaces of the electrical devices, such that the devices can be aligned relative to their widths. FIG. 1 also shows contact faces 42 of the device alignment brackets 40, which are internal surfaces of the brackets 40 that may contact, at least in part, the electrical devices.

As seen in FIG. 1, handles 60 may be mounted on the device alignment wings 30. In some instances, handles 60 allow for gripping the tool 10. For example, a human may grab handles 60 by hand to use or manipulate the tool 10. Also, handles 60 can be constructed as an expanding and contracting mechanism, coupled to the device alignment brackets 40 in a manner that allows the brackets 40 to slidable move along a sliding track 32, with respect to movement of the handles 30. Thus, the handles 30 can be used to move the device alignment brackets 40, horizontally along the face of the tool 10, such that the area of space between the brackets 40 is adjusted. For purposes of discussion, movement is discussed in relative to the device alignment brackets 40. However, it is readily recognized that in some embodiments, the device alignment wings 30 are capable of the described movement with respect to the handles 60, which in turn, causes movement of the brackets 40. Moreover, it should be appreciated that various other mechanical means capable of moving the device alignment brackets horizontally (e.g., along the x-axis) with respect to a front surface of the tool 10 can be used in alternate embodiments. The expanding and contracting mechanism can be implemented according to various embodiments, including, but not limited to: handles, rotating handles, an expanding cam system; a friction slide; and other mechanisms.

FIGS. 2A-2B illustrate that moving the handles in a particular motion, in turn, causes movement of the device alignment brackets 40 away from each other (shown by arrows). In the embodiment, sliding the handles 60 in opposing directions can impart a like sliding of the device alignment brackets 40, causing the brackets 40 to move away from each and further separate. Alternatively, sliding the handles 60 in the other direction causes the device alignment brackets 40 to move towards one another, and reducing the space between the brackets 40, as seen in FIG. 2A. As an example, starting from a position illustrated in FIG. 2B, a human can grab handles 60 and push the handles 60 towards each to gradually move the device alignment brackets 40 closer together, reducing the space to conform to dimensions of the electrical devices 70. As a result, the contact faces (shown in FIG. 1) of the device alignment brackets 40 press against the side surfaces (relative to the width) of the electrical devices 70, and firmly pressing the devices 40 against the spacer body 20. The device alignment brackets 40 contact the lateral surfaces of the electrical devices 70, in a manner ensuring that the widths of the electrical devices 70 are approximately centered (e.g., substantially same distance from spacer body 20 to external side surface), thereby achieving horizontal alignment.

Now reference is made to FIGS. 3A-3B, which show end views of the tool 10 prominently illustrating the device alignment brackets 40 on the sides of the electrical device aligning tool 10. In detail, FIG. 3A shows an example configuration of the tool 10, where the space between the device alignment brackets 40 is larger than the dimensions of the electrical devices 70. FIG. 3B shows another configuration, where the space between the device alignment brackets 40 conforms to the dimensions of the electrical devices 70, for instance because of sliding the handles 60 towards each other.

In the illustrated example, the device alignment wings 30 comprising the device alignment brackets 40 situated on both sides thereon, are arranged to form a structure that can be generally described as rectangular shaped for purposes of discussion. However, as illustrated, the geometry of the member does not form a closed rectangular structure (e.g., having three outer surfaces as opposed to four). Rather, the device alignment wings 30 has an opening in the structure, allowing this portion of the tool 10 to be inserted, in an overlay position, over the front surface of the electrical devices 70. The example electrical devices 70 are situated in the open space between the device alignment brackets 40 (and separated by spacer body 20).

In some embodiments, the contact faces 42 may include an insulation layer (indicated by stripped pattern). A soft rubber or rubber-like material, for example, covers all or portions of the interior (e.g., inward facing) of the contact faces 42 on the side of the tool 10. FIG. 3B shows the device alignment brackets 40 pressing against the sides of the electrical devices 70. In this instance, the rubber layer of the device alignment brackets 40 can help the tool 10 to firmly hold the sides of the electrical devices 70, due to friction from the rubber causing a gripping affect. Although rubber is disclosed for purposes of discussion, in other embodiments the insulation layer can include various insulation materials, for example rubberlike materials, plastics, foams, polymers, and the like, capable of achieving the same function. Moreover, contact faces 42 with insulation materials disposed thereon can allow the tool 10 to provide nonconductive effects that may help reduce the risk of hazards associated with handling conductive electrical components like electrical devices 70.

FIG. 2C illustrates another example configuration of the electrical device aligning tool 10, where the device alignment wing 30 is at a non-perpendicular angle (e.g., acute angle, less than 90-degrees) with respect to the spacer body 20. According to the embodiments, the device alignment wings 30 are capable of movement, for instance pivoting or rotating, over the spacer body 20. As an example, a human can movable pivot the device alignment wing 30 from its open position configuration, where the tool has the general "t" shape as shown in FIG. 2A (wing 30 perpendicular to the spacer body 20) to the different arrangement in FIG. 2C. To this end, the tool 10 is capable of being re-configured to suit different functions, by moving the device alignment wings 30.

Figure 7:
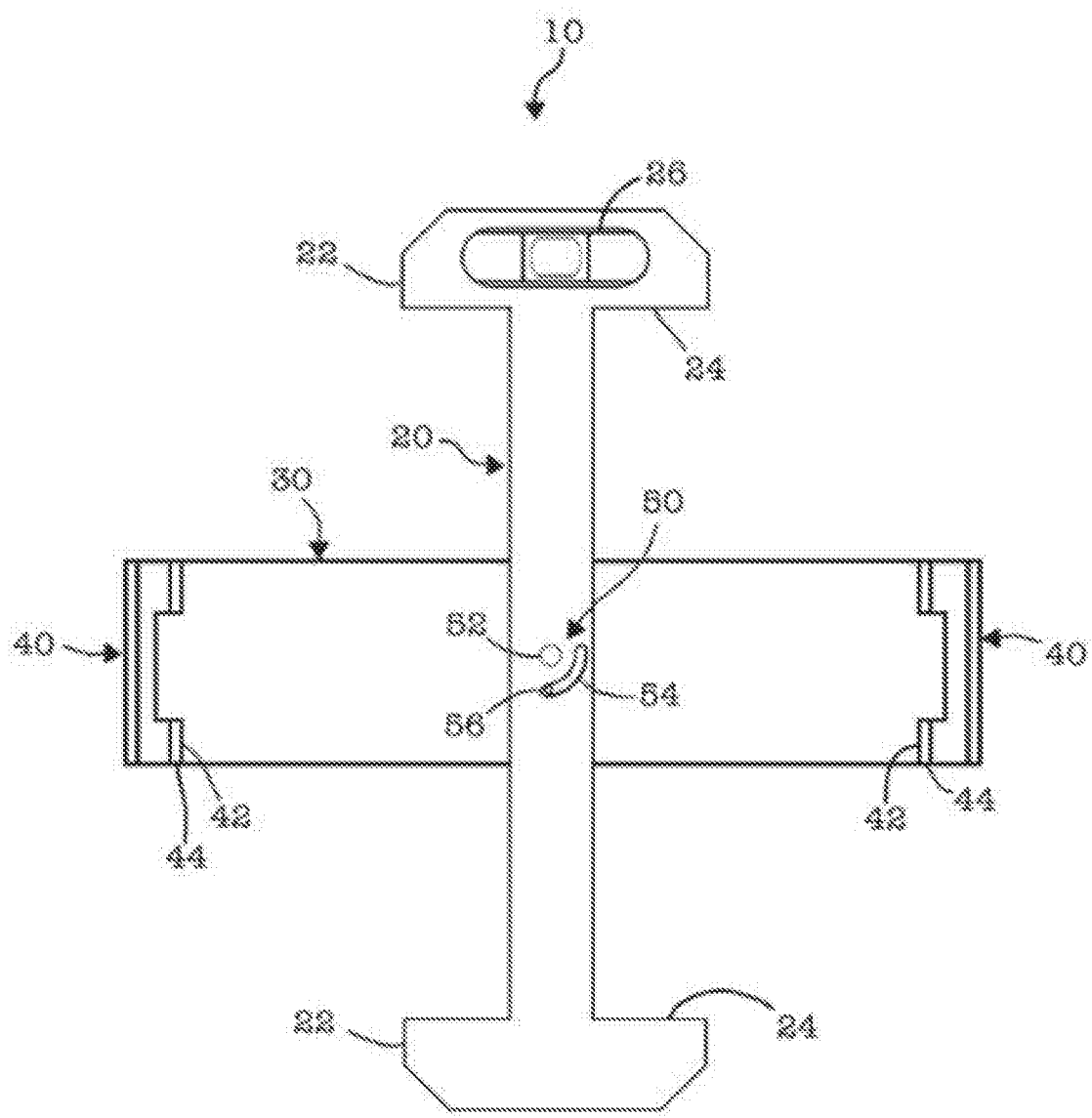
FIG. 7 is a bottom view of the example electrical device aligning tool illustrated in FIG. 4.

Referring to FIG. 7, the tool 10 can include a center pivot 52. The center pivot 52 can be a mechanical mechanism that serves as a coupling point for connecting the spacer body 20 to the device alignment wing 30, relatively at the center of the members, such that the device alignment wings 30 can pivot. For instance, the device alignment wings 30 can move from its perpendicular position, to form an acute angle relative to the spacer body 20. The tool 10 can include a pivot stop track 54 and pivot stop 56. The device alignment wing 30 can move, pivoting from the center pivot point 50, along the pivot stop track 54 until it reaches the pivot stop 56. Thus, the pivot stop track 54 and pivot stop 56 are designed to restrict movement of the device alignment wings 30, allowing pivoting to angles within the intended range, and thereby preventing a human from pivoting wings 30 in a manner that may damage the tool 10. For instance, the pivot stop 56 can placed such that the device alignment wings 30 stop once arranged in a closed position configuration (e.g., spacer body 20 parallel to the device alignment wings 30). Alternatively, the pivot stop 56 can be placed to stop the device alignment wings 30 at a perpendicular angle to the spacer body 20, thereby locking the tool 10 in the open position configuration.

Figure 2E:
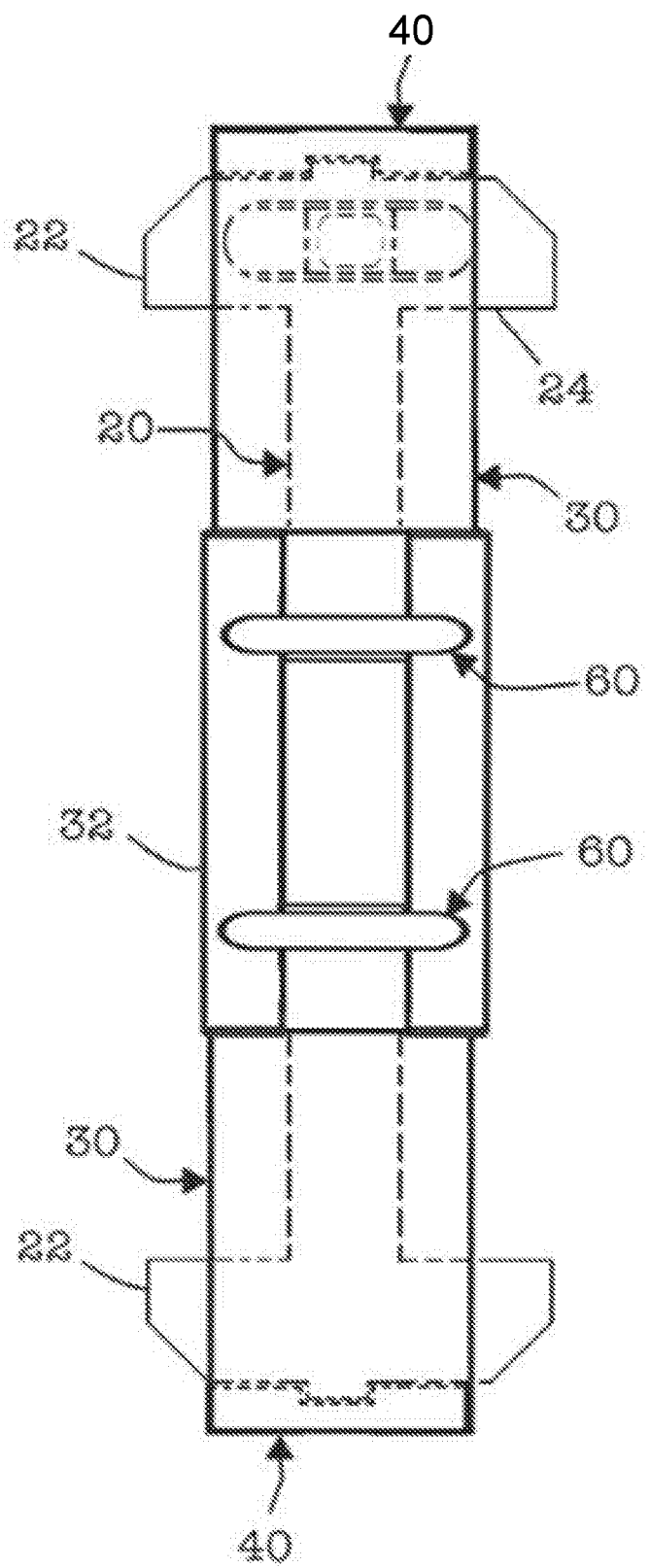
FIG. 2E is a top view of the example electrical device aligning tool illustrated in FIG. 1 arranged in an example locked position configuration of the tool in operation.
Figure 3A:
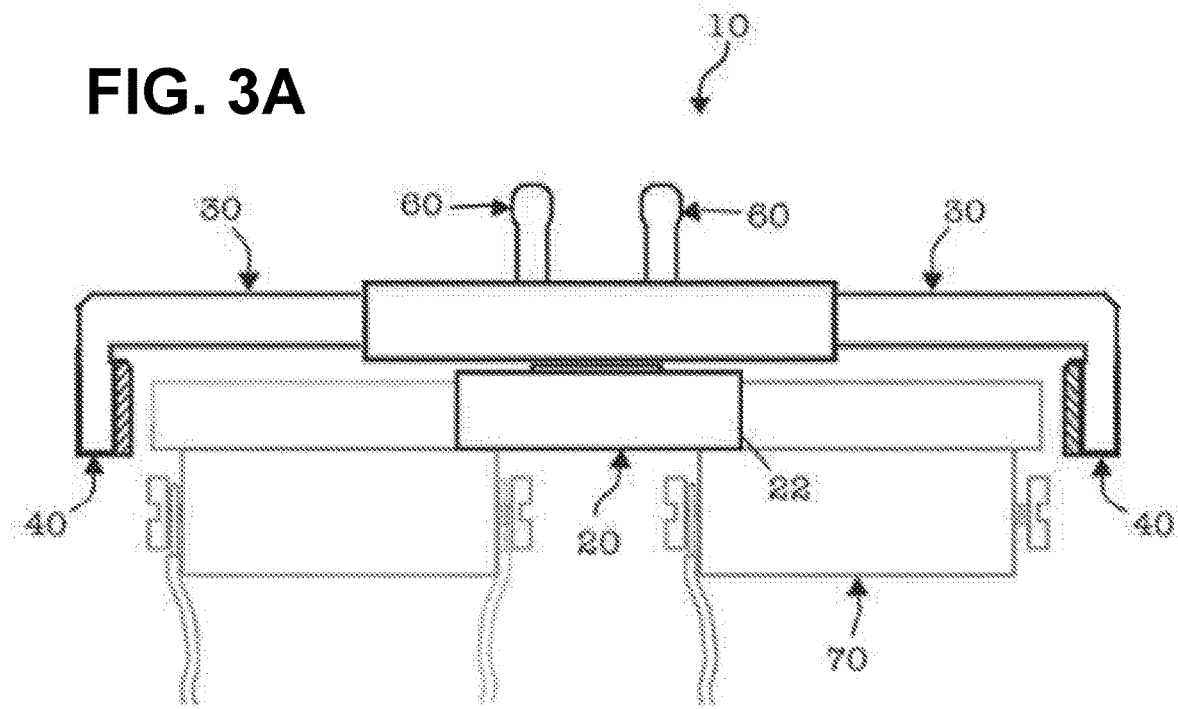
FIGS. 3A-3B are end views of the example electrical device aligning tool illustrated in FIG. 1 in an example expanded and an example contracted configuration of the tool respectively.
Figure 3B:
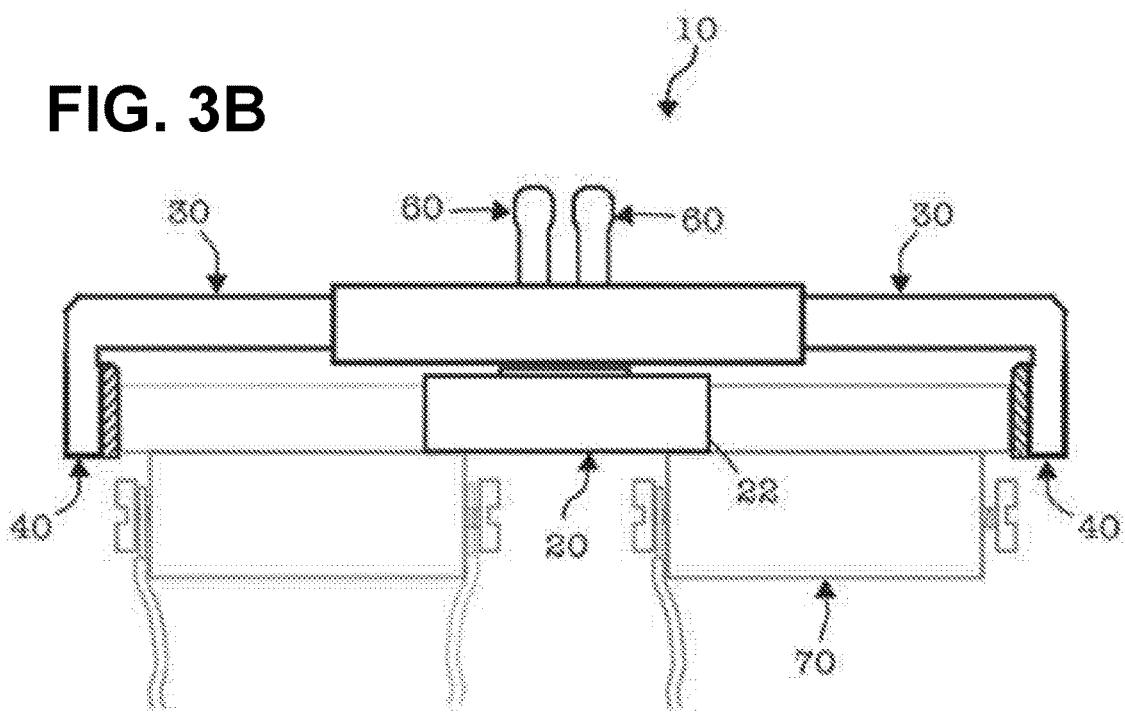

FIG. 2D is a top view of the example electrical device aligning tool 10 arranged in an example closed position configuration. In the illustrated example, the device alignment wings 30 has been aligned with the spacer body 20, such that the members are laying approximately parallel (e.g., at an angle close to, or equal to, zero degrees) on top of each other and the tool 10 generally forms an "I" shape. A protrusion 28 may be present (indicated by dashed lines) on the tool 10, located at the ends (relative to length) of the spacer body 20 which can mate with indented grooves 46 (indicated by dashed lines) along the surface of the device alignment brackets 40. The protrusion 28 can be inserted into the grooves 36, in a manner that essentially fastens the members together, or otherwise locks the tool 10 in the closed position. Thus, locking the tool 10 can prevent its components from unintentionally moving, and reduce the risk of the tool 10 being damaged. FIG. 2E illustrates an example configuration of the tool while locked, as described above. The arrangement in FIG. 2E may be desirable in certain instances, for example locking the tool 20 to remain securely closed for storage in a compact arrangement (e.g., easily fit in a tool pouch, or tool box).

Figure 4:
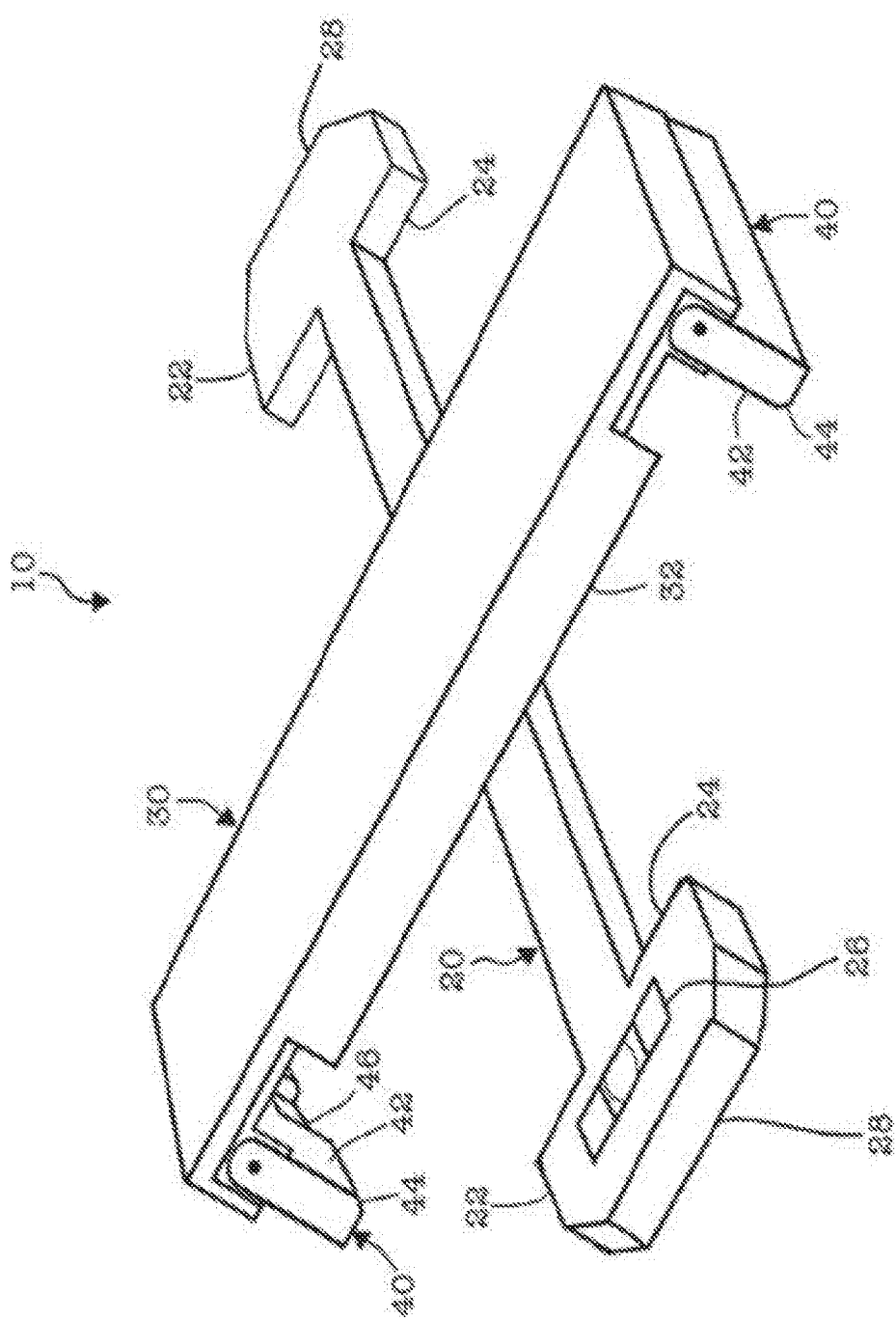
FIG. 4 is a perspective view of an example electrical device aligning tool including a retractable alignment bracket, in accordance with one embodiment of the technology described herein.
Figure 5A:
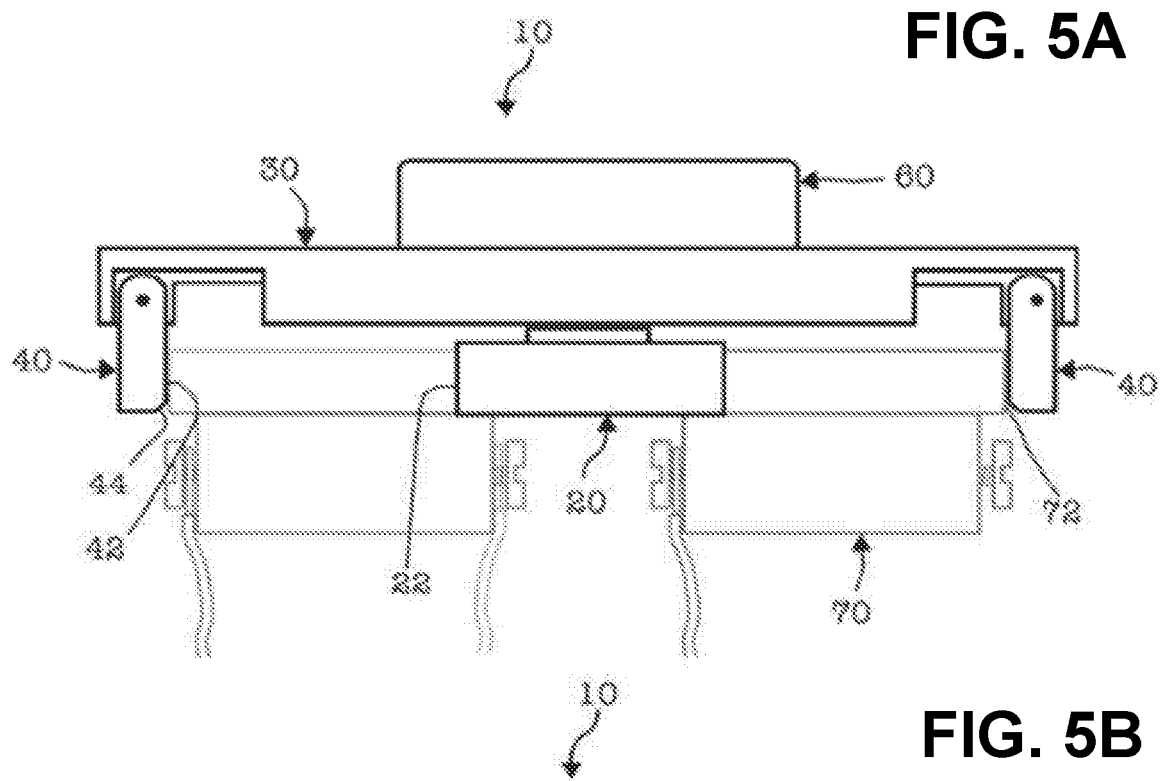
FIGS. 5A-5B are end views of the example electrical device aligning tool illustrated in FIG. 4 arranged in an example bracket extended and bracket retracted configuration of the tool respectively.
Figure 6:
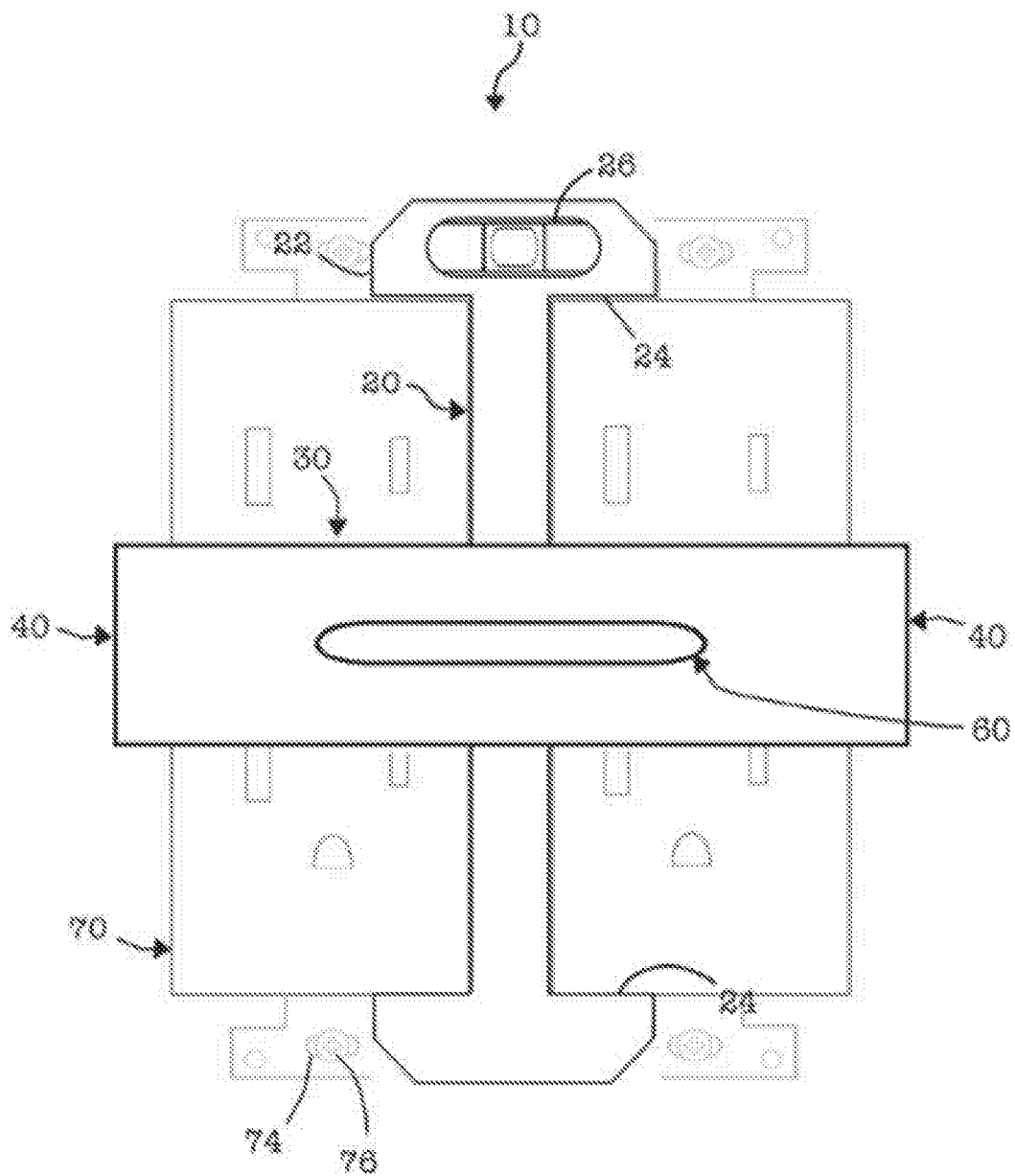
FIG. 6 is a top view of the example electrical device aligning tool illustrated in FIG. 4 engaged with electrical devices in operation.

In the example embodiments, shown in FIG. 1 for instance, the device alignment brackets 40 are lateral sections that are fixedly extend from the side surfaces of the device alignment wings 30. That is, the brackets 40 are not described to have movement in vertical plane. However, in some alternate embodiments, the device alignment brackets 40 can be implemented using various mechanical means that are capable of additional types of movement. FIG. 4 is a perspective view of an example electrical device aligning tool 10 including a retractable alignment bracket 40, in accordance with one embodiment of the technology described herein. In the illustrated example, the retractable alignment brackets 40 are hinged to the side surfaces of the device alignment wings 30, allowing the brackets 40 to moveably rotate at an angle from the hinged point, or swing in particular direction. Referring now to FIG. 5A, the retractable alignment brackets 40 are shown in an extended, or "flip down" configuration, where the brackets 40 extend downward, and approximately perpendicularly, from the lateral surfaces of the device alignment wings 30. The tool 10 is in the open position, in this illustrated configuration. For example, with the retractable alignment brackets 40 in the "flip down" position, the tool 10 can be inserted between the electrical devices 70 to perform alignment operations, as disclosed. According to the embodiment, the retractable alignment brackets 40 may have beveled, or radiused edges 44, which further push the electrical devices 70 towards each for aligning the device relative to their widths. FIG. 6 is a top view of the bracket extended configuration illustrated in FIG. 5A, showing the tool 10 engaged with electrical devices 70 in operation.

Figure 5B:
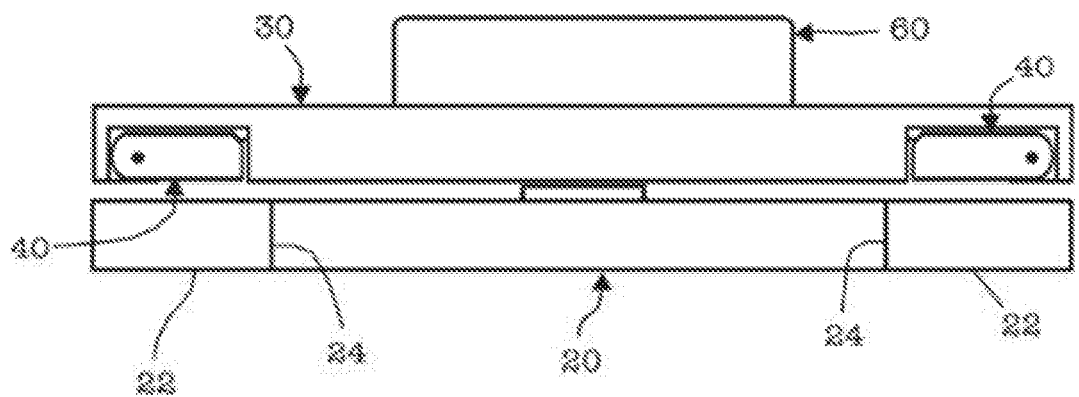
Figure 5C:
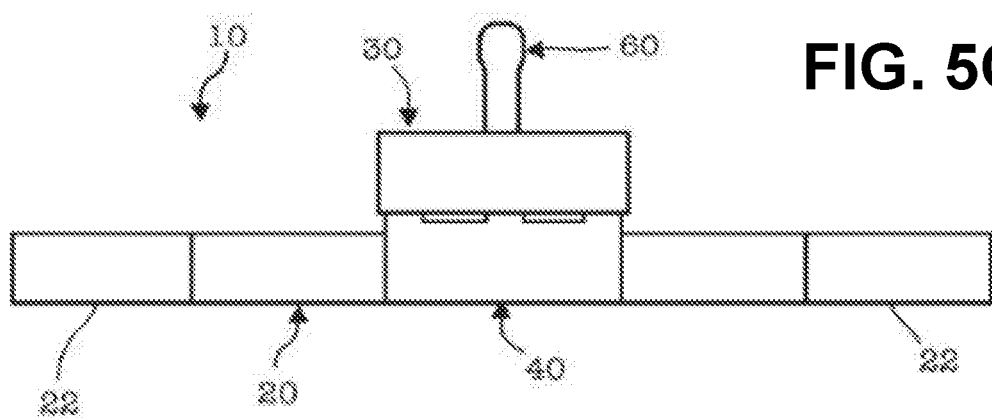
FIG. 5C is a side view of the example electrical device aligning tool illustrated in FIG. 4 arranged in an example bracket extended and bracket retracted configuration of the tool respectively.

In contrast, FIG. 5B shows the retractable alignment brackets 40 in a retracted, or "flip up", configuration, where the brackets 40 are folded into an indented section of the device alignment wings 30. FIG. 5C is a side view of the example electrical device aligning tool 10, arranged in bracket retracted configuration illustrated in FIG. 5B.

Figure 8:
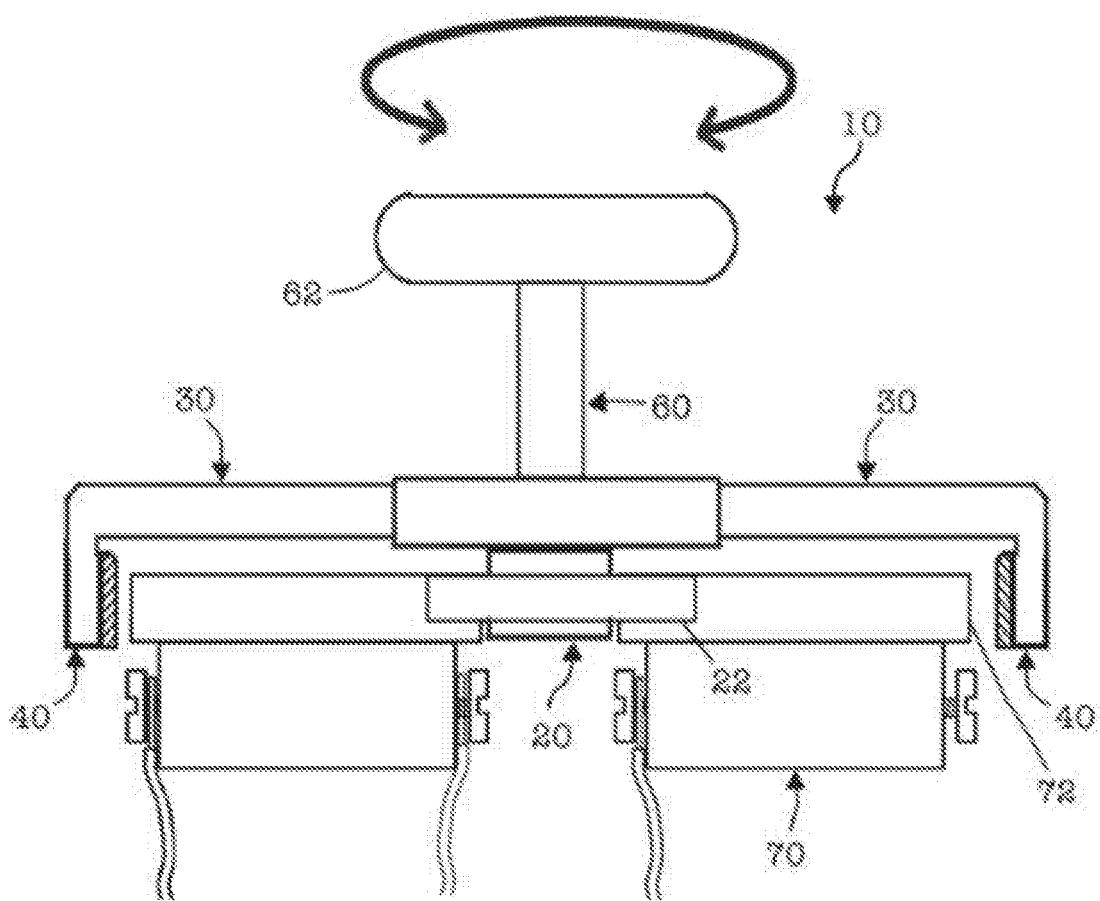
FIG. 8 is an end view of an example electrical device aligning tool including a rotating handle The figures are not intended to be exhaustive or to limit the invention to the precise form disclosed. It should be understood that the invention can be practiced with modification and alteration, and that the disclosed technology be limited only by the claims and the equivalents thereof.

As discussed referring to FIG. 1, the handles 60 can be implemented using various mechanical means that can cause movement of the electrical alignment brackets 40 as desired. FIG. 8 illustrated an example electrical device aligning tool including a rotating handle 62. The rotating handle 62 can impart movement of the device alignment brackets 40 as previously discussed. In the illustrated example, rotation of the rotating handle 62 in one direction causes the device alignment brackets 40 to move towards one another. Alternatively, rotation of the rotational handle 62 in the other direction causes the brackets 40 to move away from one another. For example, rotating the rotational handle 62 to adjust spacing between the bracket 40 can include: rotating the handle clockwise to slidably move the brackets 40 together to conform to dimensions electrical device 70; and rotating the handle counterclockwise to slidably move the brackets 40 away from each other.

While various embodiments of the disclosed technology have been described above, they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An electrical device aligning tool comprising:
    a body member, wherein the body member is a linear and elongated panel comprising an end panel at each opposing longitudinal end of the body member and forming a longitudinally perpendicular angle with the body member; and
    an intersecting member, wherein the intersecting member is a linear and elongated panel coupled to a top surface of the body member and positioned such that a length of the intersecting member longitudinally intersects the body member in a length-wise manner at an angle, the intersecting member comprising:
    expanding and contracting mechanism, and
    lateral members coupled to the expanding and contracting mechanism such that the lateral members move horizontally along a front surface of the intersecting member, with respect to a movement of the expanding and contracting mechanism, and wherein the lateral members move horizontally such that the lateral members move towards each other conforming a space between the lateral members to dimensions of an electrical device.

2. The electrical device aligning tool of claim 1, wherein each of the lateral members comprise a contact surface that firmly contacts a side surface of the electrical device, and causing the electrical device to align such that an opposing side surface of the electrical device contacts the body member.

3. The electrical device aligning tool of claim 2, wherein the body member contacts a surface of an adjacent electrical device such that the adjacent electrical device is spaced from the electrical device by distance approximate to a width of the body member.

4. The electrical device aligning tool of claim 2, wherein causing the electrical device to align positions the device for cover plate installation.

5. The electrical device aligning tool of claim 1, wherein the lateral members move away from each other such that a space between the lateral members increases.

6. The electrical device aligning tool of claim 1, wherein the end panels firmly contact surfaces on opposing sides of the electrical device causing the electrical device to align.

7. The electrical device aligning tool of claim 6, wherein the end panels firmly contact surfaces on an adjacent electrical device causing the adjacent electrical device to align with respect to the position of the electrical device.

8. The electrical device aligning tool of claim 6, wherein causing the electrical device to align positions the device for cover plate installation.

9. The electrical device aligning tool of claim 1, wherein the intersecting member longitudinally intersects the body member at a 90-degree angle and forming an open configuration.

10. The electrical device aligning tool of claim 1, wherein the body member is coupled to the intersecting member such that the intersection member pivots.

11. The electrical device aligning tool of claim 10, wherein the intersection member pivots such that the intersecting member longitudinally intersects the body member at an angle less than 90-degrees.

12. The electrical device aligning tool of claim 10, wherein the intersection member pivots such that the intersecting member longitudinally intersects the body member at an angle and forming a closed configuration.

13. The electrical device aligning tool of claim 12, wherein the closed configuration comprises locking the intersecting member and the body member in position.

14. The electrical device aligning tool of claim 1, wherein the expanding and contracting mechanism comprises a handle or a rotating handle.

15. An electrical device aligning tool comprising:
    a body member, wherein the body member is a linear and elongated panel comprising an end panel at each opposing longitudinal end of the body member, the end panels forming a longitudinally perpendicular angle with the body member and firmly contacting surface on opposing sides of an electrical device causing the electrical device to align; and
    an intersecting member, wherein the intersecting member is a linear and elongated panel coupled to a top surface of the body member and positioned such that a length of the intersecting member longitudinally intersects the body member in a length-wise manner at an angle, the intersecting member comprising:
    expanding and contracting mechanism, and
    lateral members coupled to the expanding and contracting mechanism such that the lateral members move horizontally along a front surface of the intersecting member, with respect to a movement of the expanding and contracting mechanism.

16. The electrical device aligning tool of claim 15, wherein the end panels firmly contact surfaces on an adjacent electrical device causing the adjacent electrical device to align with respect to the position of the electrical device.

17. The electrical device aligning tool of claim 15, wherein causing the electrical device to align positions the device for cover plate installation.

18. The electrical device aligning tool of claim 15, wherein the lateral members move towards each other such that a space between the lateral members conforms to dimensions of the electrical device.

19. The electrical device aligning tool of claim 18, wherein each of the lateral members comprise a contact surface that firmly contacts a side surface of the electrical device, and causing the electrical device to align such that an opposing side surface of the electrical device contacts the body member.

* * * * *